United States Patent
Smith et al.

(10) Patent No.: US 8,457,585 B2
(45) Date of Patent: Jun. 4, 2013

(54) NOISE REDUCTION SYSTEM AND METHOD

(75) Inventors: Harry B. Smith, Catonsville, MD (US); Dorothy L. Smith, legal representative, Catonsville, MD (US); Sheldon C. Smith, legal representative, Catonsville, MD (US); Jim Ross, Arbutus, MD (US); Oscar Cromer, Hanover, PA (US); Bill Gretsch, Columbia, MD (US)

(73) Assignee: C.H.I. Development Mgmt. Ltd. XIX, LLC, Wilmington, DE (US)

( * ) Notice: Subject to any disclaimer, the term of this patent is extended or adjusted under 35 U.S.C. 154(b) by 408 days.

(21) Appl. No.: 12/520,449

(22) PCT Filed: Dec. 20, 2007

(86) PCT No.: PCT/US2007/025972
§ 371 (c)(1),
(2), (4) Date: Feb. 22, 2011

(87) PCT Pub. No.: WO2008/079244
PCT Pub. Date: Jul. 3, 2008

(65) Prior Publication Data
US 2011/0021169 A1 Jan. 27, 2011

Related U.S. Application Data

(60) Provisional application No. 60/876,507, filed on Dec. 22, 2006.

(51) Int. Cl.
*H04B 1/10* (2006.01)

(52) U.S. Cl.
USPC ............ 455/296; 341/132; 341/139; 341/155

(58) Field of Classification Search
USPC .......................................................... 455/296
See application file for complete search history.

(56) References Cited

U.S. PATENT DOCUMENTS

| | | | |
|---|---|---|---|
| 6,031,869 A * | 2/2000 | Priebe et al. | 375/224 |
| 6,288,664 B1 * | 9/2001 | Swanson | 341/155 |
| 6,701,297 B2 | 3/2004 | Main | |
| 7,015,853 B1 * | 3/2006 | Wolff et al. | 341/155 |
| 7,076,227 B1 * | 7/2006 | Smith | 455/278.1 |
| 7,106,853 B1 * | 9/2006 | Smith | 379/392.01 |
| 2004/0240662 A1 * | 12/2004 | Smith | 379/395 |
| 2005/0069125 A1 * | 3/2005 | Smith | 379/395 |
| 2005/0129152 A1 | 6/2005 | Hillstrom | |
| 2006/0079192 A1 * | 4/2006 | Smith | 455/226.3 |

* cited by examiner

*Primary Examiner* — Ajibola Akinyemi
(74) *Attorney, Agent, or Firm* — Brundidge & Stanger, P.C.

(57) ABSTRACT

A noise reduction method is disclosed that uses numerical logic to estimate the value of the noise in a receive system and remove the noise. A surrogate probe value is selected and subtracted from an input signal and an iterative process selects a noise probe value for each iteration and the respective noise probe values are summed resulting in a noise estimate that is combined with the input signal.

18 Claims, 6 Drawing Sheets

FIG. 4b

NOISE REDUCTION SYSTEM AND METHOD

BACKGROUND OF THE INVENTION

This invention relates to a unique receiver processor system that improves the signal-to-noise ratio (SNR) of received signals. Unlike conventional receiver systems, a system utilizing the method in accordance with the present invention realizes a reduction in the affects of all types of noise, including but not limited to thermal noise. There are few communications systems, if any, that would not benefit from a significant reduction in the inherent thermal noise resulting from the necessary amplification practices employed in most of these type systems. All types of noise, whether it is noise received by the receiver along with the intended signal, such as in the form of interfering signals, or noise generated within the receiver system after the signal has been received, limit the ability of the receiver system to identify weak signals and distinguish them from their stronger counterparts.

Thermal noise, which is basically caused by thermal agitation of electrons in a conductor, is introduced into a receive system as a result of necessary amplification processes within the system. This type of noise is typically a limiting factor in regard to the ability of the system to identify a weak signal. When such noise is substantially reduced, a potential results for improving the receptivity of the signal, thus, also enabling tradeoffs in parameters, such as bandwidth and those typically involved in various multiplexing techniques. That is, as noise is reduced, weaker signals can be detected more reliably and a lower error rate can be achieved. After an acceptable error rate is achieved, the improvement in signal-to-noise ratio (SNR) can be parlayed into an increase in the number of signals that can be multiplexed within the system, while maintaining the same error rate; thereby increasing the signal capacity of the system.

The invention disclosed herein includes methods and corresponding system architecture that enables relatively weak signals to be readily identified by increasing the SNR of the receive system. Further, a system in accordance with the present invention can be implemented in hardware, software or a combination of both hardware and software. As will become apparent to those of skill in the art after reviewing the following disclosure, implementation of the methods and systems disclosed herein increase channel capacity of the system and improve other parameters associated with receive system performance.

More particularly, the present invention improves upon, as well as provides a unique implementation of, the iterative noise reduction processes disclosed in previous U.S. patents and published applications assigned to the current assignee of the present invention, Apex/Eclipse Systems, Inc., e.g., U.S. Pat. Nos. 7,076,227 and 7,106,853, the contents of which are incorporated herein in their entirety for all that they disclose.

Specifically, in comparison to the processing techniques disclosed and claimed in the previously issued wireless and wire-line patents and applications identified above, in accordance with the present invention the Topological Number Array (TNA) has been essentially eliminated to reduce the complexity of the processing. The notion of iterative processing was retained, but instead of operating on addresses within the TNA, according to the prior techniques, the input samples are operated upon to compute the noise estimate.

Furthermore, according to the present invention the selection of a surrogate probe and a first noise probe includes utilizing the average of input samples surrounding the input being processed. This average value is then used to select coefficients for computing the two types of probes.

According to the present invention, an improved method including, for example, implementation of one or more of the specific methods disclosed herein, which are ideally implemented in a digital system, is applied to a received signal immediately after analog-to-digital conversion (ADC) of the receive signal has occurred. In accordance with one exemplary embodiment of the invention, the method(s) are implemented in custom semiconductor gate arrays and/or programmable gate arrays.

As will become more apparent through examination of at least one example provided in detail below, one aspect of the invention includes the use of numerical logic and the relationship of various equations to quantify different functions. Methods according to the invention utilize the analysis of numerical actions to determine subsequent steps in an iterative process. Specifically, according to one or more embodiments of the invention, an estimate of a noise component of an input signal is determined and this estimated noise value is removed from the original input sample to provide an enhanced signal for subsequent signal processing.

SUMMARY OF THE INVENTION

A system in accordance with the present invention includes an improved iterative process that can be implemented using available integrated circuits. The unique method of the invention is implemented utilizing integrated circuits, or in other embodiments in software, as a pipeline of deliberate arithmetic and decision operations. Time required for processing the signals and implementing the method results in a very small transport delay which, given the large increases in SNR, is tolerable for most such receive systems.

It is, therefore, an object of the present invention to provide an improved receive system method that provides the ability to distinguish between signals with low power levels, thereby substantially increasing the SNR of the system.

A further object of the present invention is to provide a digital processing method which can be carried out in software and which uses a specially conceived integrated circuit to provide high speed processing of the iterative method.

A further object of the present invention is to provide a receive system processor whereby received signals are sampled periodically and the noise component of the overall received signal sample is estimated from each received signal-plus-noise and removed from the data sample leaving nearly noiseless samples of the received signal.

A further object of the present invention is to provide a pipeline processor that provides near-real-time iterative processing of input signal-plus-noise samples.

A further object of the present invention is to provide an iterative sequence programmer that provides real time control of the process sequences and provides responses to changing system conditions.

BRIEF DESCRIPTION OF THE DRAWINGS

The objects and features of the present invention will become more readily apparent from the following detailed description of the preferred embodiments taken in conjunction with the accompanying drawings in which:

FIG. 4b is a table providing the processing results for the iterative process performed in generating the signal diagram of FIG. 4a.

DETAILED DESCRIPTION OF EXEMPLARY EMBODIMENTS

To achieve the above and other objects of the present invention the following embodiments are provided as examples for the invention. Persons skilled in the art would be aware of techniques available to modify various elements of the invention without straying from the spirit and scope of the invention.

Figure 1:
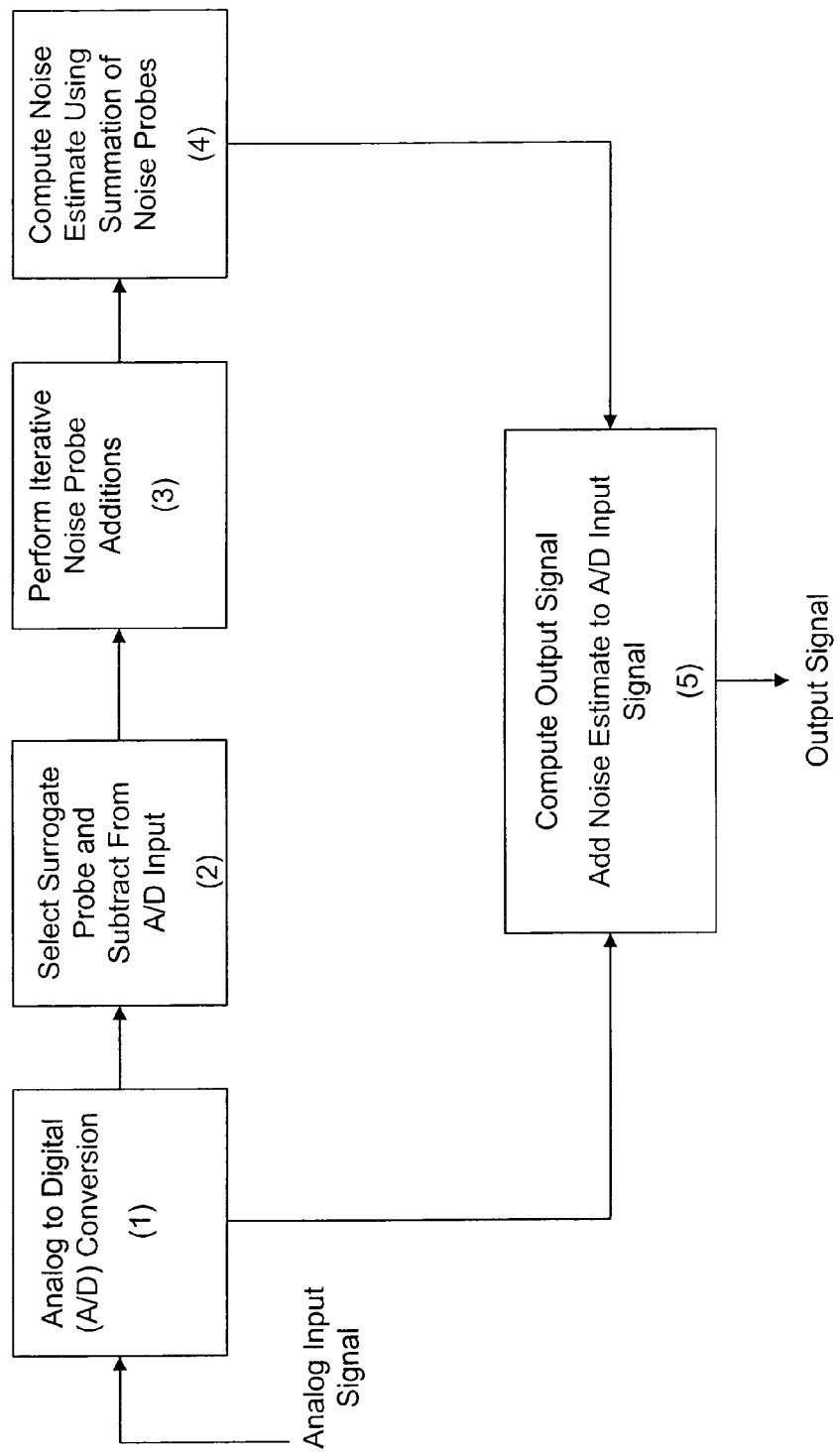
FIG. 1 is a general block diagram illustrating the various functions of the method in accordance with an exemplary embodiment of the present invention.

One exemplary embodiment of the invention disclosed and claimed herein is illustrated in FIG. 1. In particular, a general block diagram illustrating a noise reduction method according to the present invention is provided in FIG. 1. As illustrated, the method generally consists of five functions, (1) converting an analog input signal to digital form, (2) selection and subtraction of a signal surrogate probe from the digital signal, (3) an iterative process of noise probe additions, (4) computation of a noise estimate, and (5) the removal of the estimated noise from the A/D input sample. In this example, the noise probe values are negative for positive inputs and positive for negative inputs. This leads to a noise estimate that has the opposite polarity of the actual noise. Accordingly, because the estimate in this exemplary embodiment is opposite in polarity from the signal, noise is removed from the received signal by adding the noise estimate to the A/D input signal.

The method illustrated in FIG. 1 represents a departure from, or alternative to, the processing procedures disclosed and claimed in other Apex/Eclipse patents and applications, such as those identified above. For example, instead of manipulating the full topological number array (TNA), such as is disclosed in U.S. Pat. No. 7,106,853, the current approach focuses on the particular TNA element containing the input sample and applies logic to track the results from the probing operations. This new approach leads to considerable simplification in the implementation of the instant method and would, thus, simplify the design of any customized integrated circuit, software program, discrete hardware system, or any other system, designed to embody the iterative noise reduction method disclosed herein and in the other above-identified patents.

Input Sampling

As will be understood by those of skill in the art, the present invention can be utilized in both wireless and wire-line applications. However, for purposes of discussion, the present invention is presented here in the context of a wireless application. According to well known techniques, input sampling of a received wireless signal preferably occurs at the intermediate frequency (IF) stage of the receiver. The actual intermediate frequency (IF) selected is application-dependent, but for purposes of the present general embodiment an IF of 30 megahertz is selected, for example, for use in a system operating in the microwave frequency range.

Further, to achieve the most favorable results from the instant noise reduction method disclosed here, it is desirable to sample the input signal at a frequency that is a multiple of the "Nyquist" sampling rate. For example, a sampling rate of 8 or 10 times the input signal frequency is selected. Accordingly, an analog to digital conversion rate between 240 and 300 megahertz results. Also, the amplitude of the input signal-plus-noise, which is application-dependent, will require an A/D converter capable of at least 12 bits.

Sampling at the IF frequency is preferred because sampling at this rate provides a phase reference. As discussed in more detail below, knowledge of the input signal phase provides significantly enhanced results in the overall performance of the current method, but such knowledge is not essential to obtaining vast improvements in noise reduction over that which is currently available in conventional systems.

Surrogate Probe Processing

Figure 2:
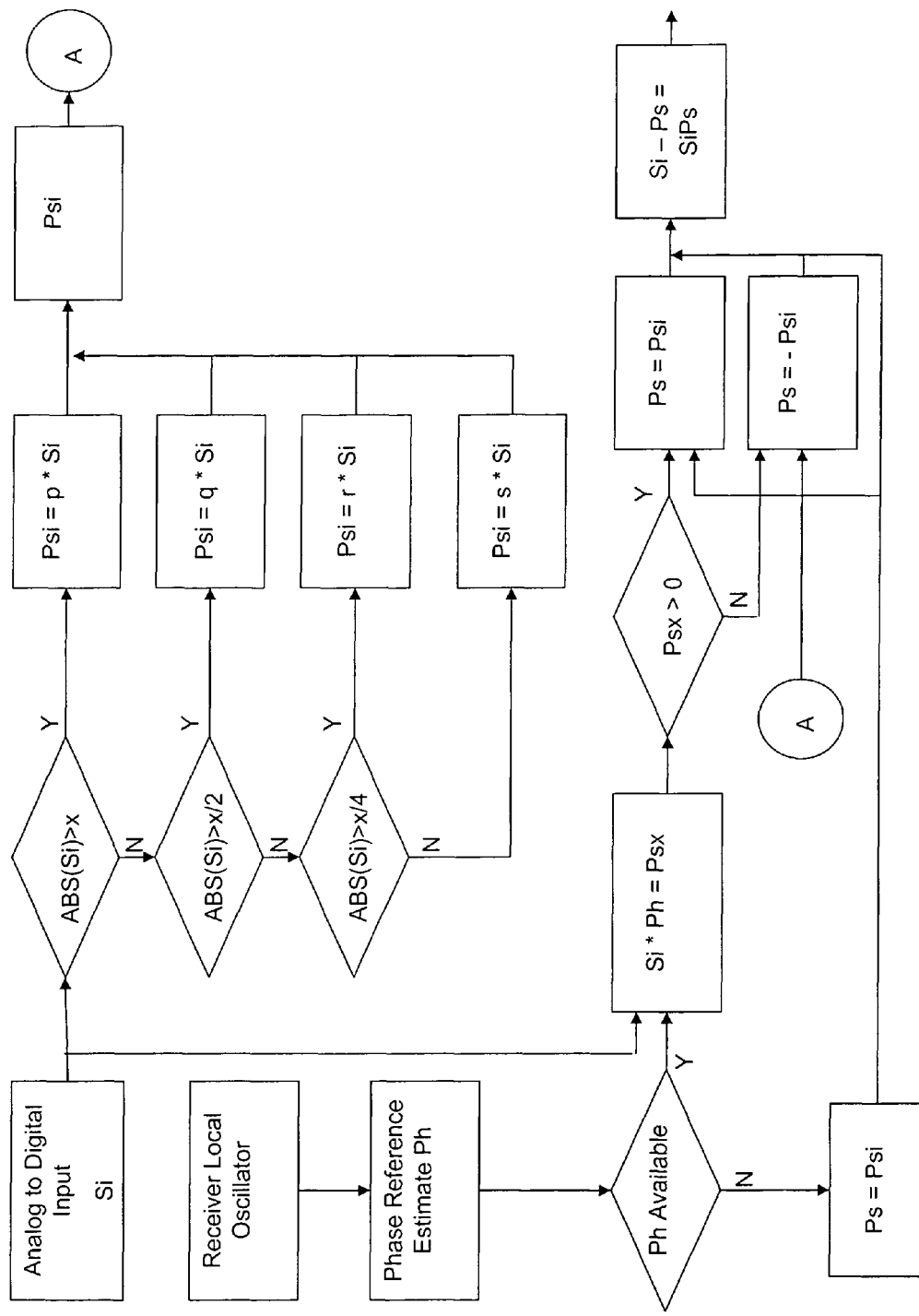
FIG. 2 is a logic flow diagram illustrating the basic processing steps associated with so-called surrogate probe processing in accordance with an exemplary embodiment of the present invention.

The selection of a so-called surrogate probe at the front-end of the current noise reduction method is preferred in order to optimize performance and prevent subsequent "noise probing" from degrading the signal of interest. FIG. 2 illustrates an exemplary embodiment of the logic utilized for proper probe value selection according to the present embodiment. In particular, the logic illustrated in FIG. 2 utilizes the input A/D signal (Si) to select an appropriate equation to be used for deriving the surrogate probe values. As shown, the absolute value of the Analog-to-Digital (A/D) input, designated Si, is compared to a predetermined value, x. For example, the value of x is initially determined to be equal to approximately 60 to 80 percent of the average value of the signal plus noise inputs surrounding the sample being processed. According to one exemplary embodiment, x equals 1.0 volt.

According to the embodiment illustrated in FIG. 2, the initial value of the surrogate probe, Psi, is determined as follows;

IF absolute value of $Si>x$, $Psi=p*Si$

IF absolute value of $Si<x$ and $>x/2$, $Psi=q*Si$

IF absolute value of $Si<x/2$ and $>x/4$, $Psi=r*Si$

IF absolute value of $Si<x/4$, $Psi=s*Si$, where p, q, r and s are constants.

For example, according to one exemplary embodiment of the invention, the values of constants p, q, r and s are initially selected to be, 0.1, 0.2, 0.3 and 0.4, respectively. The respective values of constants p, q, r and s, however, can be other than those provided here and can be changed after system initialization to obtain optimum results.

According to the embodiment illustrated in FIG. 2, in addition to determining the initial value of the surrogate probe, Psi, a further inquiry and operation is also performed to ensure the polarity of the current surrogate probe value is correct. This operation assumes a priori knowledge of a phase reference (Ph) associated with the input signal. In particular, as further illustrated in FIG. 2, according to the present embodiment, the inquiry and operation is conducted as follows;

IF$(Si*Ph)>0$, $Ps=Psi$

IF$(Si*Ph)<0$, $Ps=-1*Psi$

Specifically, the analog-to-digital input, Si, is multiplied by the phase reference, Ph. If the result of this operation is greater than zero, i.e., positive, the surrogate probe, Ps, is not modified and remains at the initial value, Psi, calculated above (i.e., Ps=Psi). Alternatively, if the result of multiplying the digital input signal, Si, by the phase reference, Ph, is less than zero, i.e., negative, the polarity of the surrogate probe, Ps, is reversed (i.e., Ps=(−1)(Psi)).

The phase correction applied to the selected surrogate probe assures that the surrogate probe has the same polarity as the phase reference. The noise reduction method according to the present invention provides improved results when the surrogate probe has the same polarity as the signal of interest. This is the rationale for performing phase correction.

Surrogate Probe Application

Figure 3:
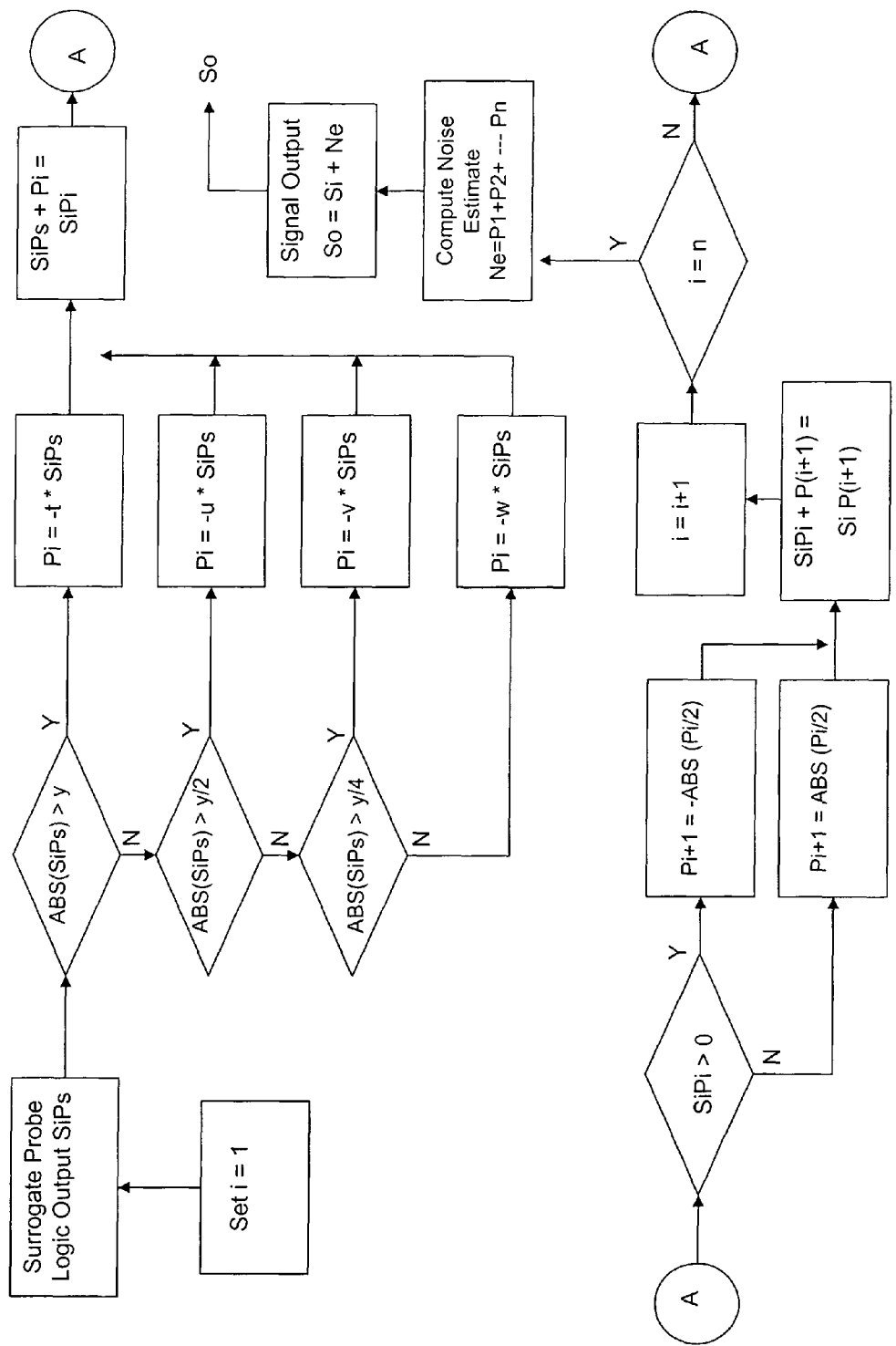
FIG. 3 is a logic flow diagram illustrating the basic processing steps associated with so-called iterative noise probe processing in accordance with an exemplary embodiment of the present invention.

According to the instant embodiment, the surrogate probe, Ps, is used as an estimate of the maximum signal level and is applied to the input A/D value, Si, prior to the iterative noise estimation processing discussed with respect to FIG. 3. More particularly, the phase-corrected surrogate probe, Ps, is subtracted from the A/D value, Si, to provide a modified input signal value, SiPs, as follows;

$$Si-Ps=SiPs$$

Iterative Noise Probing

According to the present embodiment, a noise estimating method includes the iterative noise probing process illustrated in FIG. 3. Also shown in FIG. 3, subsequent to the iterative noise probing process, the resulting noise probes are summed to determine a noise estimate. As illustrated, the modified input signal value, SiPs, determined above in reference to FIG. 2, is used as an input to the iterative noise estimating process illustrated in FIG. 3.

The amplitude of the signal after subtraction of the surrogate probe, i.e., the modified input signal value SiPs, is used to determine the first noise probe. That is, the output of the surrogate probe processing operation of FIG. 2 is compared with an application-dependent voltage level, y, or a portion thereof, to determine the value of the initial noise probe.

The comparisons are performed as follows;

IF absolute value of $SiPs>y$, $Pi=-t*SiPs$

IF absolute value of $SiPs<y$ and $>y/2$, $Pi=-u*SiPs$

IF absolute value of $SiPs<y/2$ and $>y/4$, $Pi=-v*SiPs$

IF absolute value of $SiPs<y/4$, $Pi=-w*Si$

Initially, i=1 and y=a constant, e.g., y=x. That is, according to one embodiment, variable y is initially set equal to the value of variable x, which is initially determined to be about 60-80 percent of the peak value of the signal plus noise input, as discussed above, e.g., 1.0 volt. Further, according to the present embodiment the values of variables t, u, v and w are initially set to values less than one, for example, 0.5, 0.6, 0.7 and 0.8, respectively. However, it should be noted that the values of variables t, u, v and w are not fixed and can be revised or otherwise selected as needed to optimize system performance.

The coefficients used to compute both the surrogate and noise probes differ for various levels of input signal to noise (S/N) ratios. According to one embodiment, an outer-loop control program which determines the S/N ratio of the input signal is utilized. This may be accomplished in a communication system by measuring bit error rate (BER). When the S/N=0, i.e. the signal and noise are equal, the probe values are equal; p and t are equal; q and u are equal, etc. These probes are set at p=t=0.4, q=u=0.5, r=v=0.6 and s=w=0.7.

When the level of the noise is twice the signal level, the surrogate probe values are reduced to p=0.3, q=0.4, r=0.5, and s=0.6. The values of the coefficients for the first noise probe are not increased at this point. For a noise factor four times the signal (S/N=1/4) the surrogate probe values are further reduced as follows; p=0.2, q=0.3, r=0.4, and s=0.5. The first noise probe is increased at this point as follows; t=0.5, u=0.6, v=0.7, and w=0.8. A signal to noise ratio of 1/10 leads to a further reduction in surrogate probe values as follows; p=0.1, q=0.2, r=0.3, and s=0.4. According to this example, the first noise probe coefficients do not change until the noise factor reaches 20 (S/N=1/20).

Noise probes for subsequent iterations are based on the results of the previous iteration, as follows;

IF($SiPi$)>0, $Ps(i+1)$=−Absolute value($Psi/2$)

IF($SiPi$)<0, $Ps(i+1)$=Absolute value($Psi/2$)

Further, a counter is incremented, i.e., "i" is incremented, and compared to a predetermined value, designated as n, after each iteration. That is, n is the number of iterations determined to be necessary for the method to reach an acceptable result. For example, n is chosen to be 5-7 iterations, but can be chosen to be larger or smaller depending on system performance. When the count reaches n the noise probing processing is complete.

Noise Estimate Computation

As illustrated in FIG. 3, after the preselected number of noise probe iterations, n, the respective noise probe values are summed to provide an estimate of the noise, Ne, as follows;

$$Ne=P1+P2+\ldots Pn$$

Signal Output

According to the present embodiment, after the value of the noise estimate is determined, the final step associated with the noise reduction method is performed, that is, an estimate of the output signal is calculated. Because the noise estimate has a polarity that is opposite to that of the actual noise, an estimate of the output signal is calculated by adding the noise estimate to the signal, as opposed to subtracting the noise. That is, the noise estimate, Ne, is added to the signal from the analog to digital converter, Si, to determine the output signal, as follows;

$$So=Si+Ne$$

Method Analysis Examples

An exemplary analysis of typical performance of the method presented in accordance with the current embodiment has been performed using a spreadsheet application to implement the processing. Although the results obtained by using this type of simulation are only exemplary, and actual results may be somewhat better or worse than those illustrated, the simulation demonstrated provides exemplary results.

EXAMPLE

Spread Sheet Analysis

Figure 4A:
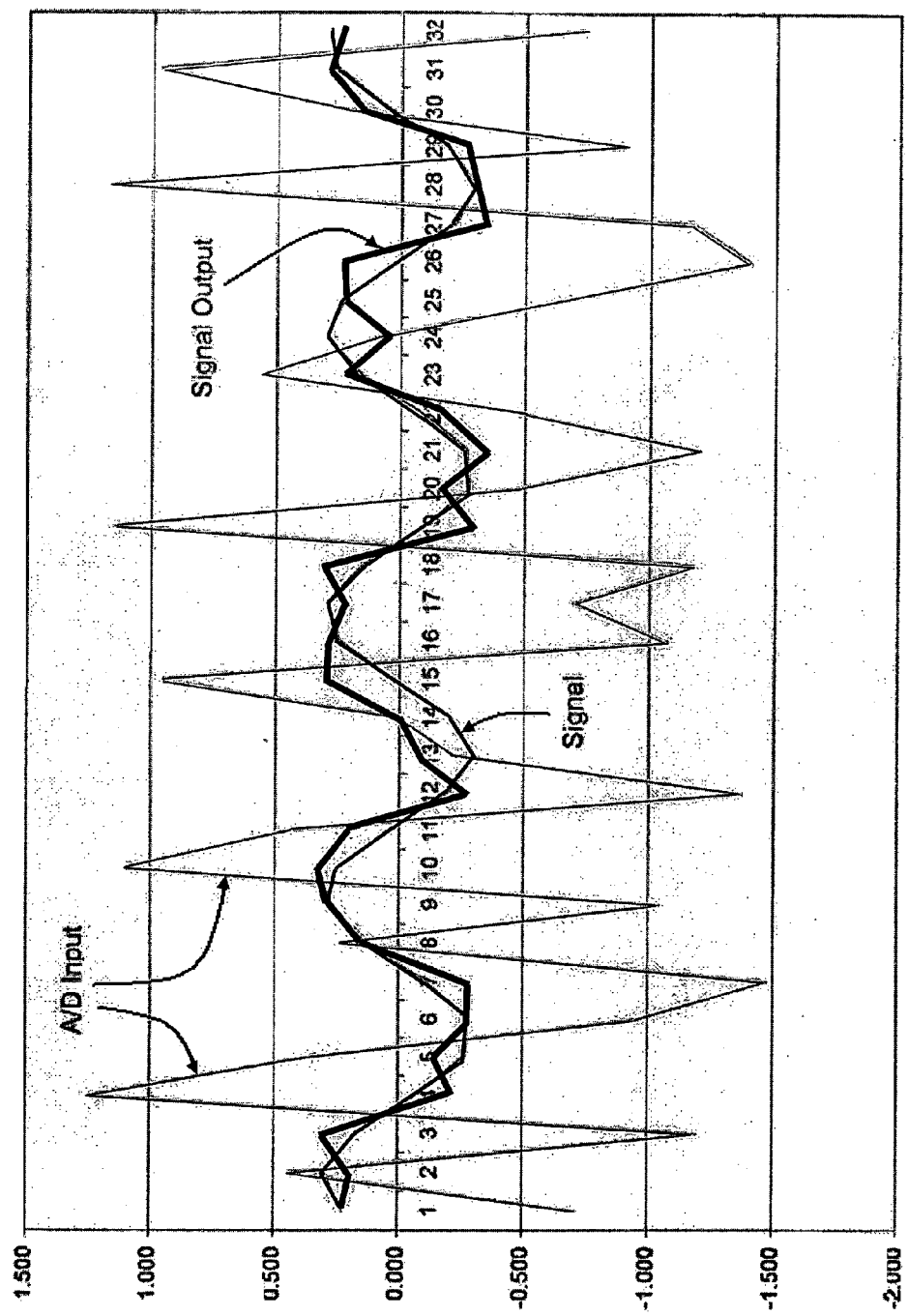
FIG. 4a is a signal diagram illustrating sample noise reduction results realized in accordance with an exemplary embodiment of the present invention.
Figure 4B:
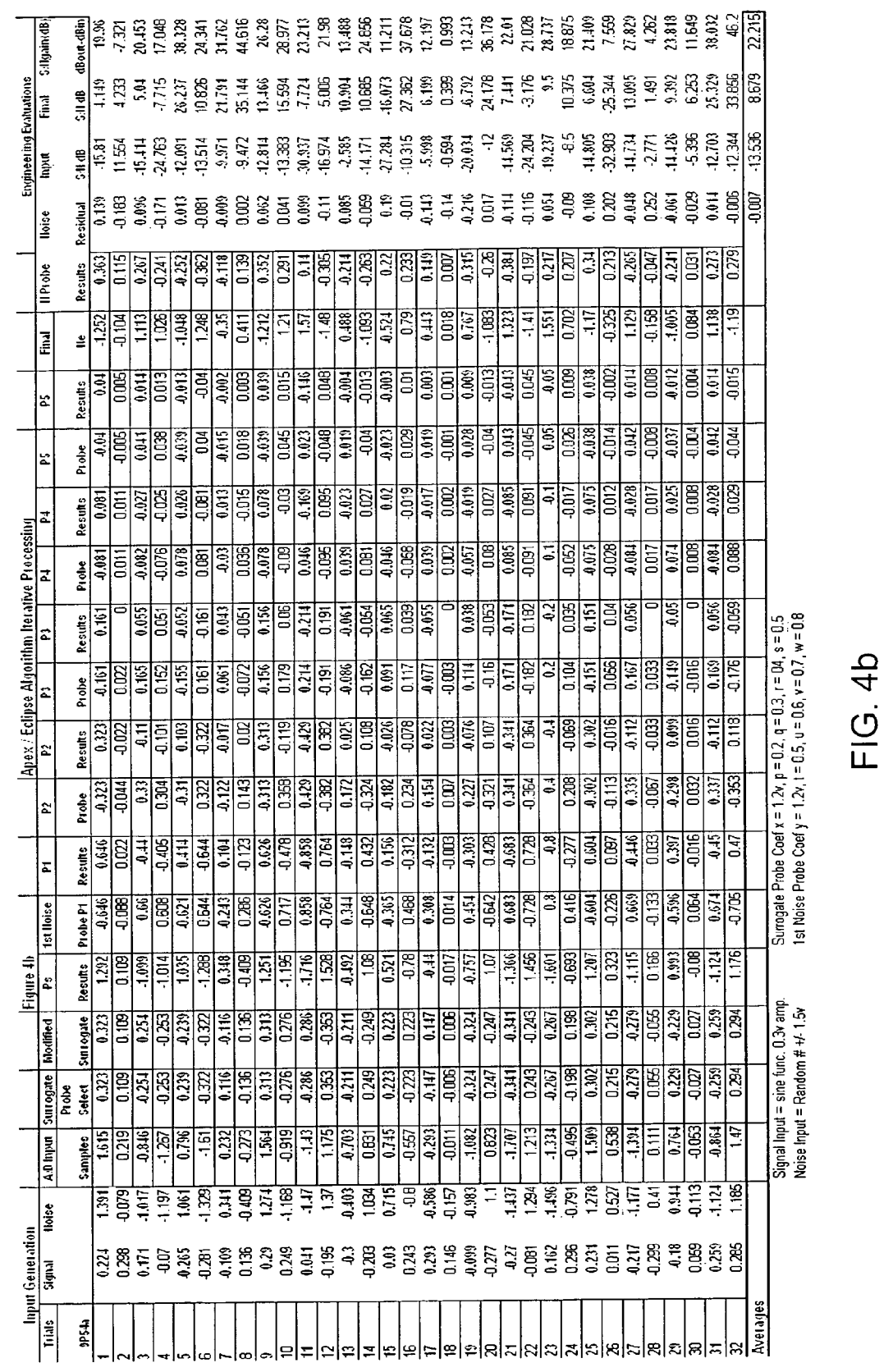

A spread sheet analysis of the noise reduction method according to the present invention shows the detailed operation of the method with iterative processing spread out. The results of such a spreadsheet example are illustrated in FIG. 4a. FIG. 4a shows a plot of an input signal, i.e., a sine function, designated "Signal", the signal-plus-noise, as seen after analog-to-digital conversion, designated "A/D Input," and the signal output after the noise is removed in accordance with the present invention, designated "Signal Output." Details of the noise reduction processing method in accordance with an embodiment of the invention are shown in the table of FIG. 4b. In particular, on the left-hand side of the table, values associated the actual sampled "Signal" are provided. To the right of the "Signal" column is a "Noise" column including the values of the random noise generated for this example. The column labeled "Noise Residual," on the right-hand side of the table, shows the noise that remains after processing and is the reason the "Signal Output" plot in FIG. 4a does not follow the "Signal" plot precisely.

As can be seen, however, the "Signal Output" plot has much less noise content than the "A/D Input," i.e., the signal-plus-noise plot. As shown at the bottom right-hand corner of the table, an average of approximately 22 dB noise reduction has been achieved in this particular example. The signal characteristics and processing coefficients used in this example are shown at the bottom of FIG. 4b. Specifically, the input "Signal" is a sine function with an amplitude of 0.3 volts and the noise is a random number varying between +/−5.0 volts.

Figure 5:
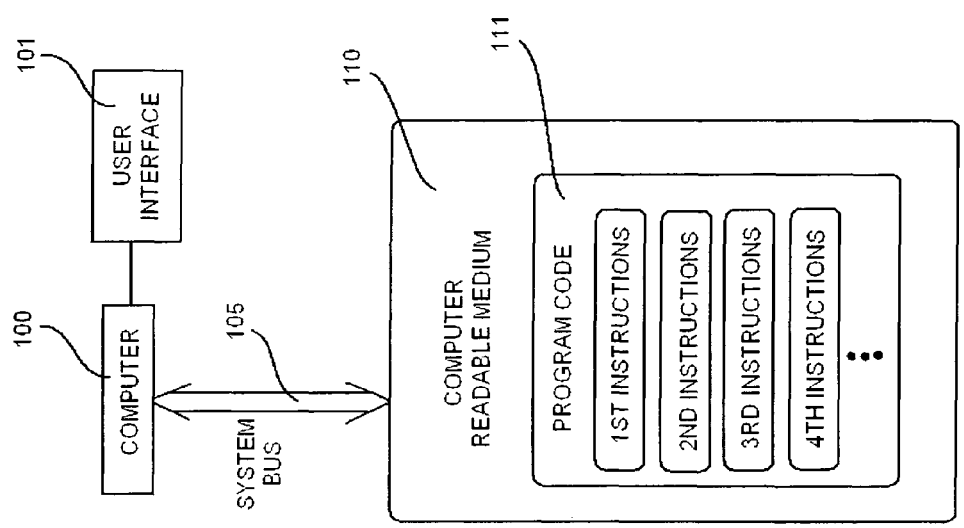
FIG. 5 is a block diagram illustrating an exemplary computer program product embodiment of the present invention.

As shown in FIG. 5, as mentioned above, the invention can take the form of a computer program product accessible from and/or embodied on, a computer-usable or computer readable medium 110 providing program code 111 for use by or in connection with a computer 100 or any instruction execution system. Further, computer 100 can optionally be operationally connected to a display device 101 or other known devices for readily obtaining and accessing data. For the purposes of this description, a computer-usable or computer readable medium 110 can be any apparatus that can contain, store, communicate, propagate, or transport the program for use by or in connection with the instruction execution system, apparatus, or device.

The computer-usable or computer readable medium 110 can be an electronic, magnetic, optical, electromagnetic, infrared, or semiconductor system (or apparatus or device) or a propagation medium. Examples of a computer readable medium 110 include a semiconductor or solid state memory, magnetic tape, a removable computer diskette, a random access memory (RAM), a read-only memory (ROM), a rigid magnetic disk, a flash disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus 105, which can comprise, for example, any known wired or wireless medium. The memory elements can include local memory employed during actual execution of the program code, bulk storage, and cache memories which provide temporary storage of at least some of the program code 111 in order to reduce the number of times code must be retrieved from bulk storage during execution.

A person of ordinary skill would understand that a method incorporating any combination of the details mentioned above would fall within the scope of the present invention as determined based upon the claims below and any equivalents thereof.

Other aspects, objects and advantages of the present invention can be obtained from a study of the drawings, the disclosure and the appended claims.

What is claimed is:

1. A method comprising:
   converting an analog input signal to a digital input signal, wherein the analog input signal includes at least an information portion and a noise portion;
   selecting an equation from a plurality of equations;
   calculating a surrogate probe value according to the selected equation;
   subtracting the surrogate probe value from the digital input signal to generate a modified input signal value;
   performing an iterative process to determine at least one noise probe value, wherein the iterative process includes comparing the modified input signal value to a first predetermined constant;
   determining a noise estimate value, wherein the noise estimate value comprises an estimate of the noise portion of the analog input signal; and
   applying the noise estimate value to the analog input signal to produce a modified input signal having a reduced noise portion.

2. The method of claim 1, wherein the converting the analog input signal to the digital input signal includes sampling the analog input signal at a frequency that is a multiple of a Nyquist sampling rate.

3. The method of claim 2, wherein the sampling of the analog input signal is performed at a frequency which is eight times the frequency of the analog input signal.

4. The method of claim 2, wherein the sampling of the analog input signal is performed at an intermediate frequency (IF) portion of the receive system.

5. The method of claim 2, wherein the sampling of the analog input signal is performed at a frequency which is ten times the frequency of the analog input signal.

6. The method of claim 1, wherein the selecting the equation from the plurality of equations comprises:
   in response to absolute value of the digital input signal being greater than a second predetermined constant, setting the surrogate probe value equal to the digital input signal multiplied by a third constant;
   in response to the absolute value of the digital input signal being less than the second predetermined constant, setting the surrogate probe value equal to the digital input signal multiplied by a fourth constant;
   in response to the absolute value of the digital input signal being less than the second predetermined constant divided by two, setting the surrogate probe value equal to the digital input signal multiplied by a fifth constant; and
   in response to the absolute value of the digital input signal being less than the second predetermined constant divided by four, setting the surrogate probe value equal to the digital input signal multiplied by a sixth constant.

7. The method of claim 6, wherein at least one of the third, fourth, fifth and sixth constants is less than zero.

8. The method of claim 1, further comprising:
   multiplying the digital input signal by a phase reference; and
   in response to the result of the multiplying being less than zero, reversing the polarity of the surrogate probe value.

9. The method of claim 1, further comprising:
   determining whether the modified input signal value is greater than a value equal to at least a fraction of the first constant;
   multiplying the modified input signal value by a negative constant resulting in an iterative surrogate probe value, wherein the value of the negative constant is determined based on the result of determining whether the modified input signal value is greater than a value equal to at least a fraction of the first constant; and
   adding the iterative surrogate probe value to the modified input signal value resulting in an iterative modified input signal value.

10. The method of claim 9, further comprising:
    summing at least one iterative modified signals values resulting in a noise estimate value; and
    adding the noise estimate value to the digital input signal resulting in a final output value.

11. A non-transitory computer-readable medium storing executable instructions that, when executed, cause a computer to perform operations comprising:
- converting an analog input signal to a digital input signal, wherein the analog input signal includes at least an information portion and a noise portion;
- selecting an equation from a plurality of equations;
- calculating the surrogate probe value according to the selected equation;
- subtracting the surrogate probe value from the digital input signal to generate a modified input signal value;
- performing an iterative process to determine at least one noise probe value, wherein the iterative process includes comparing the modified input signal value to a first predetermined constant;
- determining a noise estimate value, wherein the noise estimate value is an estimate of the noise portion of the analog input signal; and
- applying the noise estimate value to the analog input signal to produce a modified input signal having a reduced noise portion.

12. The non-transitory computer-readable medium of claim 11, further comprising:
- equation selecting logic configured to select an equation from a plurality of equations; and
- surrogate probe calculating logic configured to calculate the surrogate probe value according to the selected equation.

13. The non-transitory computer-readable medium of claim 12, further comprising:
- surrogate probe setting logic configured to set the value of the surrogate in accordance with the following:
  - in response to absolute value of the digital input signal being greater than a second predetermined constant, setting the surrogate probe value equal to the digital input signal multiplied by a third constant;
  - in response to the absolute value of the digital input signal being less than the second predetermined constant, setting the surrogate probe value equal to the digital input signal multiplied by a fourth constant;
  - in response to the absolute value of the digital input signal being less than the second predetermined constant divided by two, setting the surrogate probe value equal to the digital input signal multiplied by a fifth constant; and
  - in response to the absolute value of the digital input signal being less than the second predetermined constant divided by four, setting the surrogate probe value equal to the digital input signal multiplied by a sixth constant.

14. The non-transitory computer-readable medium of claim 12, further comprising:
- modified input signal logic configured to determine whether the modified input signal value is greater than a value equal to at least a fraction of the first constant;
- multiplier logic configured to multiply the modified input signal value by a negative constant resulting in an iterative surrogate probe value, wherein the value of the negative constant is determined based on the result of the modified input signal logic; and
- addition logic configured to add the iterative surrogate probe value to the modified input signal value resulting in an iterative modified input signal value.

15. A system comprising:
- a converter configured to convert an analog input signal to a digital input signal;
- a surrogate probe determiner configured to select an equation from a plurality of equations and calculate a surrogate probe value according to the selected equation;
- a surrogate probe subtracter configured to subtract the surrogate probe value from the digital input signal to generate a modified input signal value;
- a comparator configured to compare the modified input signal value to a predetermined constant;
- an iterative processor configured to perform an iterative process to determine at least one noise probe value based on a result of the comparator;
- a noise estimate determiner configured to determine a noise estimate value substantially equal to a level of a noise portion of the analog input signal; and
- a combiner configured to apply the noise estimate value to the analog input signal to produce a modified input signal having a reduced noise portion.

16. A system comprising:
- at least one integrated circuit device configured to:
  - select an equation from a plurality of equations;
  - calculate a surrogate probe value according to the selected equation;
  - determine whether a modified input signal value is greater than a value equal to at least a fraction of a predetermined constant;
  - multiply the modified input signal value by a negative constant resulting in an iterative surrogate probe value, wherein the value of the negative constant is determined based on a result of determining whether the modified input signal value is greater than a value equal to at least a fraction of the predetermined constant; and
  - add the iterative surrogate probe value to the modified input signal value resulting in an iterative modified input signal value having a reduced noise value.

17. A method comprising:
- selecting an equation from a plurality of equations;
- calculating a surrogate probe value according to the selected equation;
- determining whether a modified input signal value is greater than a value equal to at least a fraction of a first constant;
- multiplying the modified input signal value by a negative constant resulting in an iterative surrogate probe value, wherein the value of the negative constant is determined based on a result of determining whether the modified input signal value is greater than a value equal to at least a fraction of the first constant; and
- adding the iterative surrogate probe value to the modified input signal value resulting in an iterative modified input signal value having a reduced noise value.

18. A method comprising:
- converting an analog input signal to a digital input signal, wherein the analog input signal includes at least an information portion and a noise portion;
- selecting an equation from a plurality of equations;
- calculating the surrogate probe value according to the selected equation;
- subtracting the surrogate probe value from the digital input signal to generate a modified input signal value;
- comparing the modified input signal value to a first predetermined constant to determine a noise probe value;
- determining a noise estimate value, wherein the noise estimate value comprises an estimate of the noise portion of the analog input signal; and applying the noise estimate value to the analog input signal to produce a modified input signal having a reduced noise portion.

* * * * *